(12) United States Patent
Betts-Johnson (10) Patent No.: US 7,686,448 B2
(45) Date of Patent: Mar. 30, 2010

(54) EYEGLASS FRAMES

(76) Inventor: Marie Betts-Johnson, P.O. Box 676147, Rancho Santa Fe, CA (US) 92067

( * ) Notice: Subject to any disclaimer, the term of this patent is extended or adjusted under 35 U.S.C. 154(b) by 151 days.

(21) Appl. No.: 11/820,064

(22) Filed: Jun. 18, 2007

(65) Prior Publication Data

US 2007/0291220 A1    Dec. 20, 2007

Related U.S. Application Data (60) Provisional application No. 60/814,331, filed on Jun. 16, 2006.

(51) Int. Cl.
*G02C 5/14* (2006.01)
(52) U.S. Cl. .................. 351/119; 351/123; 351/158
(58) Field of Classification Search .................. 351/41, 351/59, 111–123, 158, 63
See application file for complete search history.

(56) References Cited

U.S. PATENT DOCUMENTS

| | | | |
|---|---|---|---|
| 1,936,773 A * | 11/1933 | Splaine | .......... 351/122 |
| 3,010,365 A * | 11/1961 | Sadel | .......... 351/111 |
| 3,955,885 A | 5/1976 | Aronsohn | |
| 4,017,165 A | 4/1977 | Davis | |
| 4,204,749 A | 5/1980 | Davis | |
| 4,367,929 A * | 1/1983 | Fortini | .......... 351/119 |
| 4,768,872 A | 9/1988 | Fraselle | |
| 4,902,120 A | 2/1990 | Weyer | |
| 5,096,284 A | 3/1992 | NakaMats | |
| 5,162,823 A | 11/1992 | Goldstein | |
| 5,781,272 A * | 7/1998 | Bright et al. | .......... 351/123 |
| 5,859,684 A * | 1/1999 | Rittmann | .......... 351/111 |
| 6,010,215 A | 1/2000 | Miceli | |
| 6,439,718 B1 | 8/2002 | Miceli | |
| 6,530,660 B1 | 3/2003 | Chao | |
| 6,652,093 B1 | 11/2003 | Lamy | |
| 6,719,425 B2 | 4/2004 | Conner | |
| 6,887,994 B2 | 5/2005 | Stamler et al. | |
| 7,004,582 B2 | 2/2006 | Jannard | |
| 2005/0136977 A1 | 6/2005 | Levy | |

FOREIGN PATENT DOCUMENTS

| | | | | |
|---|---|---|---|---|
| JP | 2005-37614 | * | 2/2005 | ........ 351/123 |
| WO | WO 91/07685 | | 5/1991 | |
| WO | WO 2005/081045 A1 | | 9/2005 | |

* cited by examiner

*Primary Examiner*—Huy K Mai (57) ABSTRACT

The present invention relates to eyeglasses and eyeglass frames comprising adjustable earpieces to align and attach to the wearer's ears or earlobes, thus avoiding contact with the wearer's hairline and hair, and minimizing contact with the skin.

13 Claims, 6 Drawing Sheets

EYEGLASS FRAMES

FIELD OF THE INVENTION

The present invention relates to the field of eyeglasses. In particular, the invention relates to an eyeglass frame which avoids contact with the wearer's hair and an improved support member for eyeglasses to accomplish the same.

BACKGROUND OF THE INVENTION

People having their hair dyed at a beauty salon usually wait twenty to thirty minutes or longer to allow the dye to process completely. To occupy themselves during this time they may read their email, a book, or a magazine, or listen to music.

However, for those who wear reading glasses, the normal placement of the earpieces in standard eyeglasses disturbs the hair dye. This results in unwanted streaking or smearing of the dye on the skin. This can result in an unsatisfactory hair treatment. For people with sensitivities to chemicals or fragrances on the face, neck, and/or ears, this may also cause adverse reactions.

To date, the current design of standard eyeglasses does not allow for effective reading during hair dying procedures. Trying to balance eyeglasses on the nose, while the earpieces are hanging down the face, makes the eyeglasses very unstable. Reading while rearranging a magazine or book back and forth in order to attain the proper reading focus is difficult and stressful. Therefore, there is the need for specially designed eyeglasses, eyeglass frames, and custom earpieces to ameliorate the forgoing situations.

There is also a need for alternatives to conventional earpieces to minimize contact with the wearer's skin, such as with people having sensitivities or allergies wherein materials of the earpiece or contact of the earpiece to the skin causes pain or irritation.

There is further a need for an improved means of securing safety glasses or shields on a patient lying down during medical or dental procedures in the head and neck area, or by a health care worker administering such treatments.

There is, moreover, a need for solutions to these problems that are suitable for both men and women, and which provide comfort, durability, and ease of use.

SUMMARY OF THE INVENTION

The foregoing and further needs are met by embodiments of the invention, which provides novel eyeglasses, eyeglass frames, and support members for securing eyeglasses, lenses, or face or eye shields to a person while minimizing contact with hair and skin. The novel support members are designed to function with the same stability as earpieces on traditional eyeglasses, but with the accommodation that the support members do not extend as far back to or into the hairline.

In certain embodiments, the present invention comprises an eyeglass frame comprising a lens-holding member and two curvilinear support members, the support members each having a proximal end and a distal end, the proximal end being attached to the lens-holding member, and the distal end being terminated with a fastener.

In certain embodiments, the present invention comprises a support member for eyeglasses comprising a curvilinear member with a hinge-piece on the proximal end and a fastener on the distal end.

In certain embodiments, the present invention comprises a support member for eyeglasses comprising curvilinear support members each with the proximal end connected to a lens-holding member or directly to the lenses, and a hole at the distal end, perpendicular through the curvilinear support member for receiving the stud of a pierced-ear earring.

In certain embodiments, the present invention comprises an eyeglass frame wherein the support members are alignable to attach to the ears of the wearer.

In certain embodiments, the present invention comprises an eyeglass frame wherein the support members are hingeably attached to the lens-holding portion.

In certain embodiments, the present invention comprises an eyeglass frame wherein the support members comprise at least one angular changes of direction to align with the wearer's earlobes.

In certain embodiments, the present invention comprises an eyeglass frame wherein the at least one angular changes on the support members are each continuously adjustable from 0 to 180 degrees by at least one pivot members contained on the support members.

In certain embodiments, the present invention comprises an eyeglass frame wherein the at least one angular changes of the support members are independently fixed at angles less than about 180 degrees.

In certain embodiments, the present invention comprises an eyeglass frame wherein the support members are bendable to achieve said alignment with the wearer's earlobes.

In certain embodiments, the present invention provides an eyeglass frame wherein the fasteners on the distal ends of the support members comprise pierced-ear earring fasteners.

In certain embodiments, the present invention comprises an eyeglass frame wherein the fasteners on the distal ends of the support members are placed through a perpendicular hole at the distal end of each support member.

In certain embodiments, the present invention comprises an eyeglass frame wherein the fasteners on the distal ends of the support members comprise spring earring clasp fasteners.

In certain embodiments, the present invention comprises an eyeglass frame wherein the fasteners on the distal ends of the support members comprise magnetic earring fasteners.

In certain embodiments, the present invention comprises an eyeglass frame wherein the fasteners on the distal ends of the support members comprise adhesive tabs.

In certain embodiments, the present invention comprises an eyeglass frame wherein the support members attach to the wearer's earlobes.

In certain embodiments, the present invention comprises an eyeglass frame wherein the support members attach to the edge of the wearer's ear.

In certain embodiments, the present invention comprises an eyeglass frame wherein said support members comprise a shape memory material.

In certain embodiments, the present invention comprises eyeglasses comprising lenses mounted in a lens-holding member and two support members, the support members each having a proximal end and a distal end, the proximal end being attached to the lens-holding member, and the distal end being terminated with a fastener.

In certain embodiments, the present invention comprises eyeglasses wherein the lenses provide vision correction for the wearer.

In certain embodiments, the present invention comprises eyeglasses wherein the lenses do not provide vision correction.

In certain embodiments, the present invention comprises eyeglasses wherein the support members are alignable to attach to the ears of the wearer.

In certain embodiments, the present invention comprises eyeglasses wherein the support members are hingeably attached to the lens-holding portion.

In certain embodiments, the present invention comprises eyeglasses wherein the support members comprise at least one angular changes of direction to align with the wearer's earlobes.

In certain embodiments, the present invention comprises eyeglasses wherein the at least one angular changes on the support members are each continuously adjustable from 0 to 180 degrees by at least one pivot members contained on the support members.

In certain embodiments, the present invention comprises eyeglasses wherein the at least one angular changes on the support members are fixed at angles ranging between about 90 and about 180 degrees.

In certain embodiments, the present invention comprises eyeglasses wherein the support members are bendable to achieve said alignment with the wearer's ear.

In certain embodiments, the present invention comprises eyeglasses wherein the fasteners on the distal ends of the support members comprise pierced-ear fasteners.

In certain embodiments, the present invention comprises eyeglasses wherein the fasteners on the distal ends of the support members are placed through a perpendicular hole at the distal end of each support member.

In certain embodiments, the present invention comprises eyeglasses wherein the fasteners on the distal end of the support members comprise spring earring clasp fasteners.

In certain embodiments, the present invention comprises eyeglasses wherein the fasteners on the distal ends of the support members comprise magnetic earring fasteners.

In certain embodiments, the present invention comprises eyeglasses wherein the fasteners on the distal ends of the support members comprise adhesive tabs.

In certain embodiments, the present invention comprises eyeglasses wherein the support members attach to the wearer's earlobes.

In certain embodiments, the present invention comprises eyeglasses wherein the support members attach to the edge of the wearer's ear.

In certain embodiments, the present invention comprises eyeglasses wherein said support members comprise a shape memory material.

In a certain embodiment, the present invention comprises an eyeglass frame comprising a lens holding member having a right side and a left side, two support members having a proximal end and a distal end, the proximal ends each being attached to the lens holding member, one on the left side and one on the right side thereof, and said distal ends thereof terminating in a fastener, wherein said support members each contain on or more pivot points, said pivot points being rotatable from about zero to about 180 degrees.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

The present invention provides embodiments for novel support members for eyeglasses, lenses, or face shields. These novel support members are designed to function with the same stability as earpieces on traditional eyeglasses, but with the accommodation that the support members do not extend as far back to or into the hairline. However, as discussed below, other configurations are also contemplated.

As used herein, the terms "comprising", "including", "such as", and "for example" are used in their open, non-limiting sense.

The term "about" is used synonymously with "approximately."

The term "earpieces" refers to those portions of eyeglasses or eyeglass frames that traditionally run perpendicular from the lenses to the tops of the wearer's ears. In the context of this application, these are also referred to as "support members", "supporting members" and in some embodiments as "curvilinear support members" or "curvilinear supporting members."

Standard reading glasses typically contain three elements: (1) the frame, (2) the lenses, and (3) earpieces that extend over and behind the ears to hold the glasses in place on the nose so that the wearer's vision may be properly corrected. Other configurations include frameless lenses wherein the earpieces are attached directly to the lenses and the lenses are joined with a bridge or nose rest. In the context of this invention, "frameless lenses" are still considered as having a lens-holding member and defined within the term "eyeglass frame." Still other configurations include eye shields such as those worn by healthcare professionals, and safety goggles which typically include a coating or polymer sheet to protect the eyes from debris or light. Lenses or shields can be clear, tinted, or coated to prevent transmission there through of one or more wavelengths of light (e.g., sunglasses or laser goggles). Lenses can also offer vision correction and/or act as a barrier to the transmission of light, debris, or contaminants.

Figure 1:
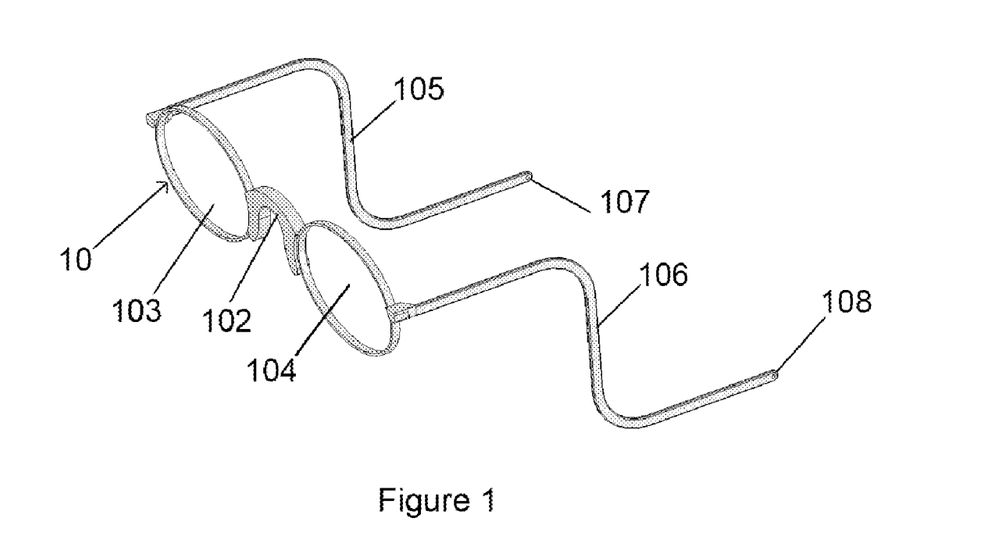
FIG. 1 shows a perspective view of an embodiment of the invention.

Turning now to FIG. 1 which depicts a perspective view of one embodiment of the invention. Lens holding member 10 comprises two lens mounting holes 103 and 104, which in certain embodiments may each contain lenses, as well as a bridge or nose-rest portion 102 interposed between the two lens mounting holes 103 and 104. This aspect of the embodiment is well known in the art of eyeglasses. The embodiment shown also comprises two novel curvilinear support members 105 and 106 in place of more traditional earpieces. These support members may be connected directly to the lenses or to a lens supporting member by way of a hinge or other flexible means as is know in the art of eyeglass construction. Additionally, they may form a single continuous piece with the lens holding member 10 if, for example, the embodiment is made in a plastic mold. Each support member 105 and 106 is terminated with a fastener or hole at 107 and 108, respectively. As will be seen below, the curvilinear support members may be made to assume a variety of angles to fit the needs of the wearer.

Additionally, the embodiments presented herein are applicable to both eyeglasses, eyeglass frames, frameless lenses, and a variety of other eyeshields, and eye protectors.

In certain embodiments the support members are connected directly to the lenses. In other embodiments the support members are connected to a lens-holding member.

Figure 2:
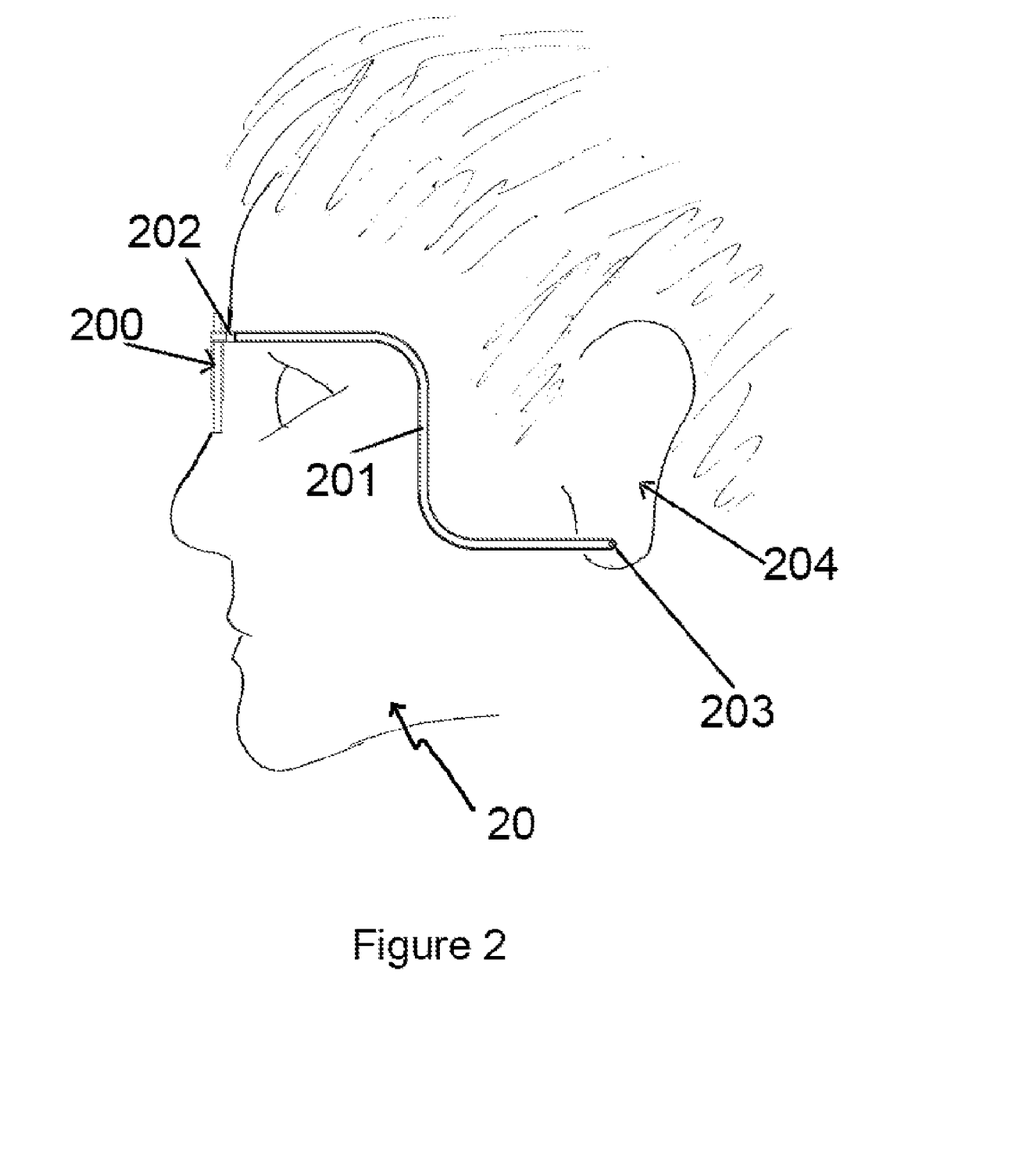
FIG. 2 shows a side view of an embodiment of the invention utilizing curvilinear support members.

FIG. 2 depicts a side view of one embodiment of the invention. Lens holding member 200 is held in place by two identically shaped support members, although only one 201 is shown. The proximal end 202 is connected to the lens holding member 200 by means of a hinge or other flexible connection. The distal end 203 is attachable to the ear 204 of the wearer 20 by means of a clip, fastener or other means located at the distal end 203.

This attachment is preferably made at the earlobe, but could equally be made at another portion of the ear or surrounding area. In certain embodiments where the wearer has pierced ears, a stud or prong can be embedded, connected, soldered, or otherwise attached to the distal end of the support member. The stud or prong is pushed through the wearer's pre-existing hole in the earlobe or other portion of the ear and secured with a clip, fastener or other means as described herein or know in the art.

Figure 5:
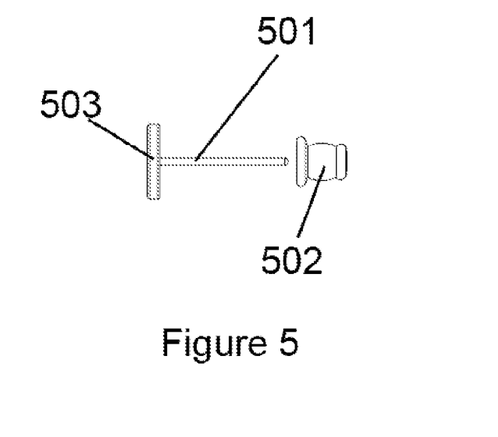
FIG. 5 shows a fastener as may be used in certain embodiments of the invention

FIG. 5 depicts a cross-sectional view of an embodiment of a stud or prong and clip as described above. Stud 501 is affixed to the distal end of a support member 503. The stud 501 is pressed through the pierced ear hole of the wearer and clip 502 is placed over the end of stud 501. This fastener is appropriate to all support member embodiments described herein.

In other embodiments, an approximately perpendicular hole is fabricated in the distal end 203 of the support member 201 allowing the wearer to employ an earring made for pierced ears to connect the earpiece to the earlobe by passing the stud or prong of the earring through the hole in the support member and through the hole in the ear, after which the stud is secured with a clip or other means.

Figure 6:
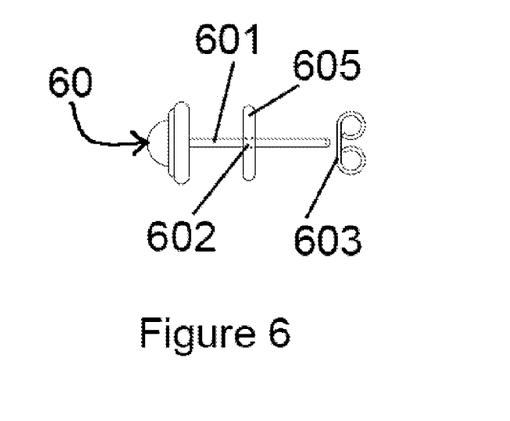
FIG. 6 shows an additional fastener as may be used in certain embodiments of the invention

FIG. 6 shows a cross-sectional view of an embodiment of a pierced ear earring and clip as described above. The stud 601 of earring 60 is inserted through a hole 602 in the distal end of support member 605 and then pushed through the pierced ear hole of the wearer, after which it is secured with clip 603. This fastener is appropriate to all support member embodiments described herein.

In certain embodiments, the fasteners on the distal ends of the support members are placed through an approximately perpendicular hole at the distal end of each support member.

Figure 7:
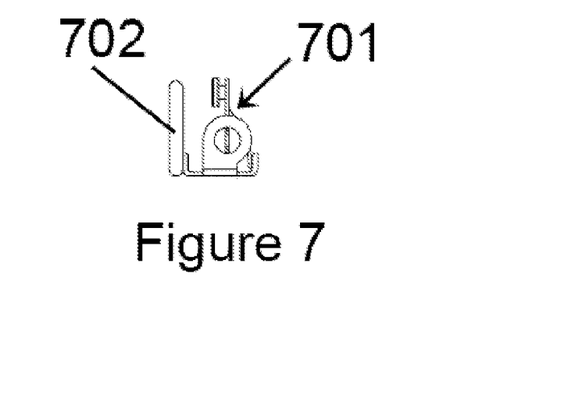
FIG. 7 shows an additional fastener as may be used in still other embodiments of the invention.

In some embodiments, such as those for wearers who do not have ear-piercings, a spring clip is soldered, glued, or otherwise attached to the distal end of the support member and is used to secure the support member to the ear of the wearer. FIG. 7 shows a cross-sectional view of spring clip 701 attached to the distal end of support member 702. This fastener is appropriate to all support member embodiments described herein.

As will be evident to those skilled in the art, a wide variety of methods and devices exist for securing earrings to a wearer's ear and are applicable to the embodiments presented herein. These methods and devices include, but are not limited to, magnets, magnetic clips, screw clips, wire hoops, other fashion earrings, as well as pressure-sensitive adhesives, and adhesive tabs.

In certain embodiments pressure sensitive adhesive tabs are employed to secure the support members to the wearer's ears. Such an embodiment would be particularly advantageous, for example, in the instance where the eyeglasses or eye shields are configured for one-time use (e.g., eye shields for medical and dental applications, wherein they intended for disposal after patient use).

While it is generally preferred to attach the support members to the earlobes of the wearer, they can also be attached to other portions of the ear that are typically pierced, or to an area in the vicinity of the ear or earlobe.

Figure 3:
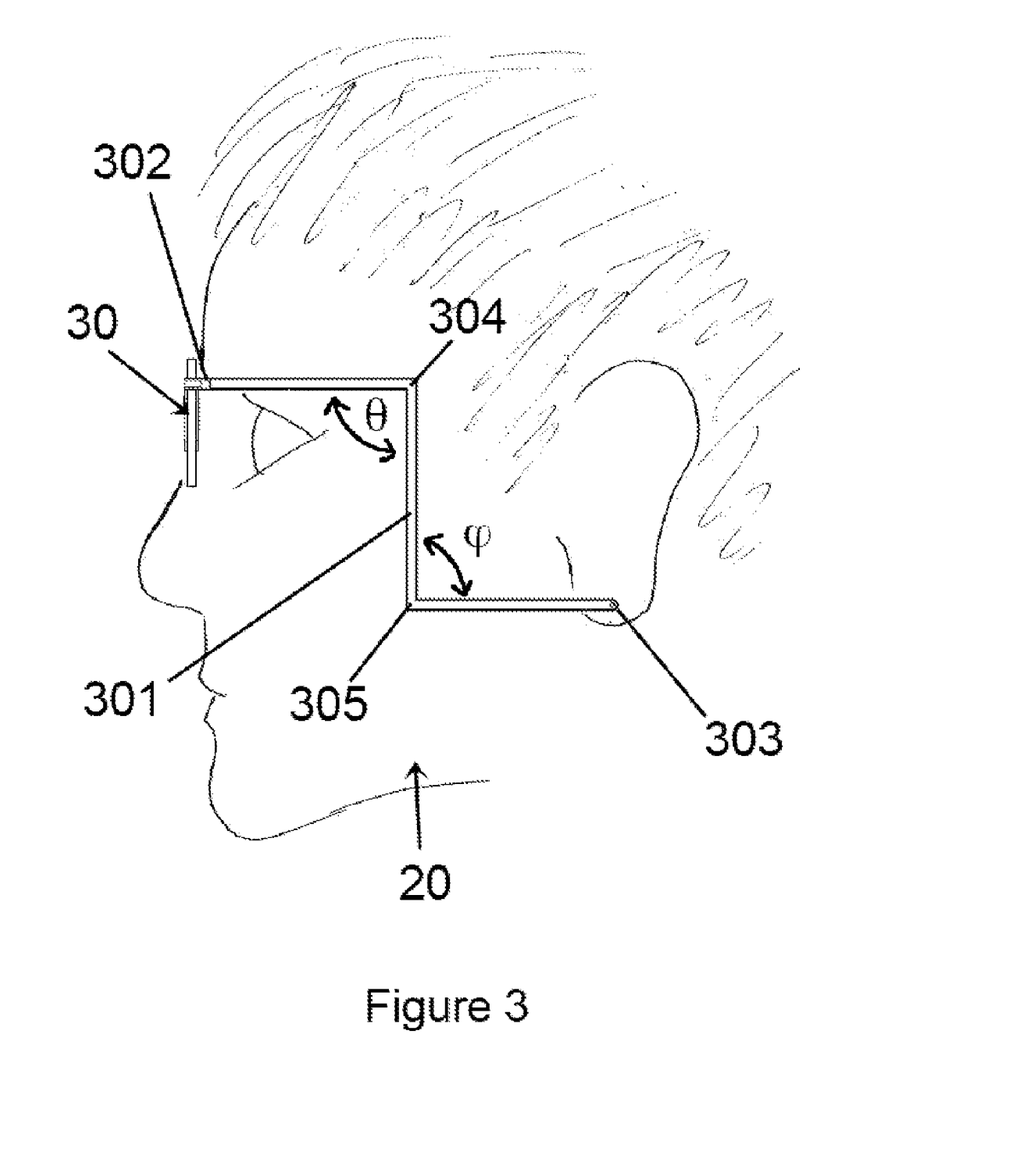
FIG. 3 shows a side view of an additional embodiment of the invention utilizing angular support members.

FIG. 3 depicts an embodiment of the invention demonstrating the use of various degrees of curvature of the support members. From the connection 302 joining the proximal end of the support member 301 to the lens holding member 300, the support member 301 extends distally to some point 304, typically but not limited to midway between the wearer's temple and hairline. At that juncture, the support members are fabricated with a curve or bend at a downward angle $\theta$ at 304. From there, the support members are fabricated with a curve or bend at a second point 305 with a second angle $\phi$ at 305 to align the distal end 303 with the area on the ear where the wearer will secure the support member (for example, the wearer's earlobe). As will be evident to one skilled in the art, the selection of the angles $\theta$ at 304 and $\phi$ at 305 will depend on the physical features of the wearer. Various combinations will be evident to accommodate a variety of wearers and achieve stability of the lens holding member.

In certain embodiments angles $\theta$ at 304 and $\phi$ at 305 are approximately 90 degrees.

In still other embodiments said angles are greater than about 90 degrees.

In certain embodiments, said angles range between about 100 and about 160 degrees.

In still other embodiments, said angles range between about 120 to about 150 degrees.

In certain embodiments, one or both of said angles may be configured to be less than about 90 degrees.

In certain embodiments, the shape of the support member will be an "S" curve as shown in FIG. 2.

In certain embodiments, one of angles $\theta$ at 304 or $\phi$ at 305 will be about 180 degrees and the and the shape of the support member will be a "C" curve or a "J" curve.

In certain embodiments, each support member is connected to the lens holding member with a flexible hinge.

In other embodiments, each support member may be connected to the lens holding member with a flexible material, such as rubber, metal, or flexible plastic.

In certain embodiments, each support member may be connected to the lens holding member with an inflexible member.

In still other embodiments, each support member may be integral with at least one of the lens holding member, or lens, and not include a hinge.

For embodiments as described above wherein avoiding contact with the wearer's hair is desirable, any suitable configuration of lines, curves, and angles can be employed that prevent substantial contact between portions of the face or scalp having hair growth and the supporting members.

Figure 4:
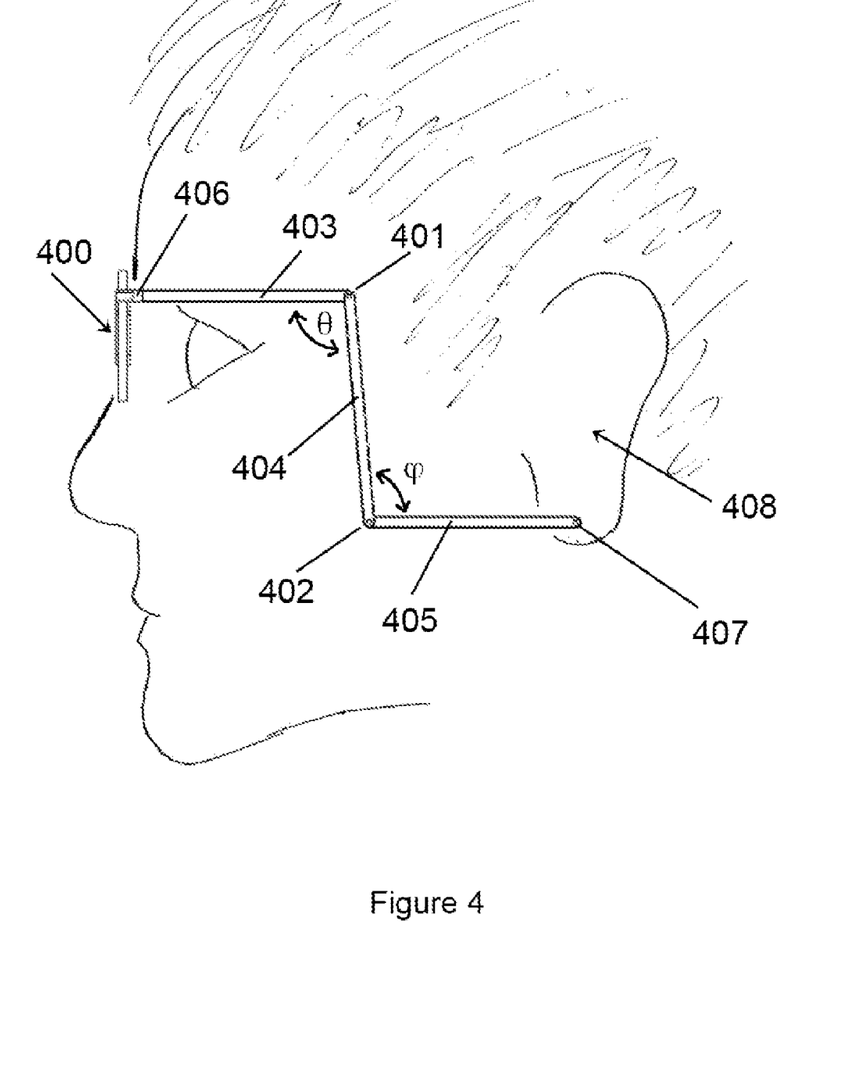
FIG. 4 shows a side view of an additional embodiment of the invention utilizing pivot points on the support members.

FIG. 4 demonstrates the use of pivot points on the support members. From the connection 406 joining the proximal end of the support member 40 to the lens holding member 400, a segment 403 of the support member 40 extends distally to some point, typically but not limited to midway between the wearer's temple and hairline. At that juncture, a pivot point 401 in the support member enables a downward angle θ to be achieved. A second segment 404 extends distally to a second pivot point 402, enabling a second angular adjustment of the direction of the support member φ and ensuring alignment of the distal end 407 of the last segment 405 of the support member with the wearer's earlobe 408.

In a certain embodiment, the pivot points 401 and 402 are each used to achieve angular changes of about 90 degrees.

In other embodiments, the pivot points 401 and 402 are used to achieve angular changes greater than about 90 degrees.

In still other embodiments, the pivot points 401 and 402 are used to achieve angular changes less than about 90 degrees.

As will be evident to one skilled in the art, the selection of the angles will depend on the physical features of the wearer. Use of pivot points confers a distinct advantage for accommodating wearers with different distances between temple and earlobe. Various combinations will be evident to one skilled in the art to accommodate a variety of wearers. Further, it will be evident that the angles achieved by each pivot point need not be the same.

In certain embodiments, the pivot points 401 and 402 are used to achieve angular changes from zero to 360 degrees.

In a particular embodiment, the inclusion of pivot points 401 and 402 enables the wearer to collapse the support members by folding the individual support member segments 403, 404, and 405 onto themselves. This is achieved by rotating the individual segments about the pivot points to an angle of zero degrees relative to the neighboring segment. When a hinge or flexible attachment is used at 406 to join the support member to the lens holding member, the resulting eyeglasses or eyeglass frames become compact and convenient for storage by the wearer.

In another embodiment, the nose bridge, shown as 102 in FIG. 1, may be fabricated with a hinge element resulting in a more fully folding pair of glasses.

In certain embodiments, only one pivot point 401 is present.

In certain embodiments, a single pivot point is used to achieve angular changes between zero and 360 degrees.

In certain other embodiments, a third or more pivot points may be added. Additional pivot points may provide greater ease of fitting the eyeglasses or eye shields to the wearer.

In certain embodiments, a third or more pivot points are each capable of achieving angular changes between zero and 360 degrees.

The embodiments as described herein may be constructed from any of a variety of materials used in the manufacture of eyeglasses, among them being plastics, including polycarbonate plastic; metals, including titanium, plated metal, nickel-free plated metal, and stainless steel.

In certain embodiments of the above configurations, the support members can be fabricated from shape memory plastic, such as described in U.S. Pat. Nos. 4,950,258 and 6,719,425, which are hereby incorporated by reference.

In other embodiments of the above configurations, the support members can be fabricated from shape memory metals.

In still other embodiments of the above configurations, flexible support members can be fabricated from plastic or rubber coated wire.

Electronic devices, such as Bluetooth wireless technology or other technologies can be attached to an earpiece or earbud integrated into one or both support members, thus allowing the wearer to listen to music or talk on a Bluetooth-enabled cell phone or other electronic device. Various other electronic devices and technologies suitable for use in the present embodiment include mp3 players, video games, radios, televisions, CD players, and other devices employing headphones or earbuds.

Figure 8:
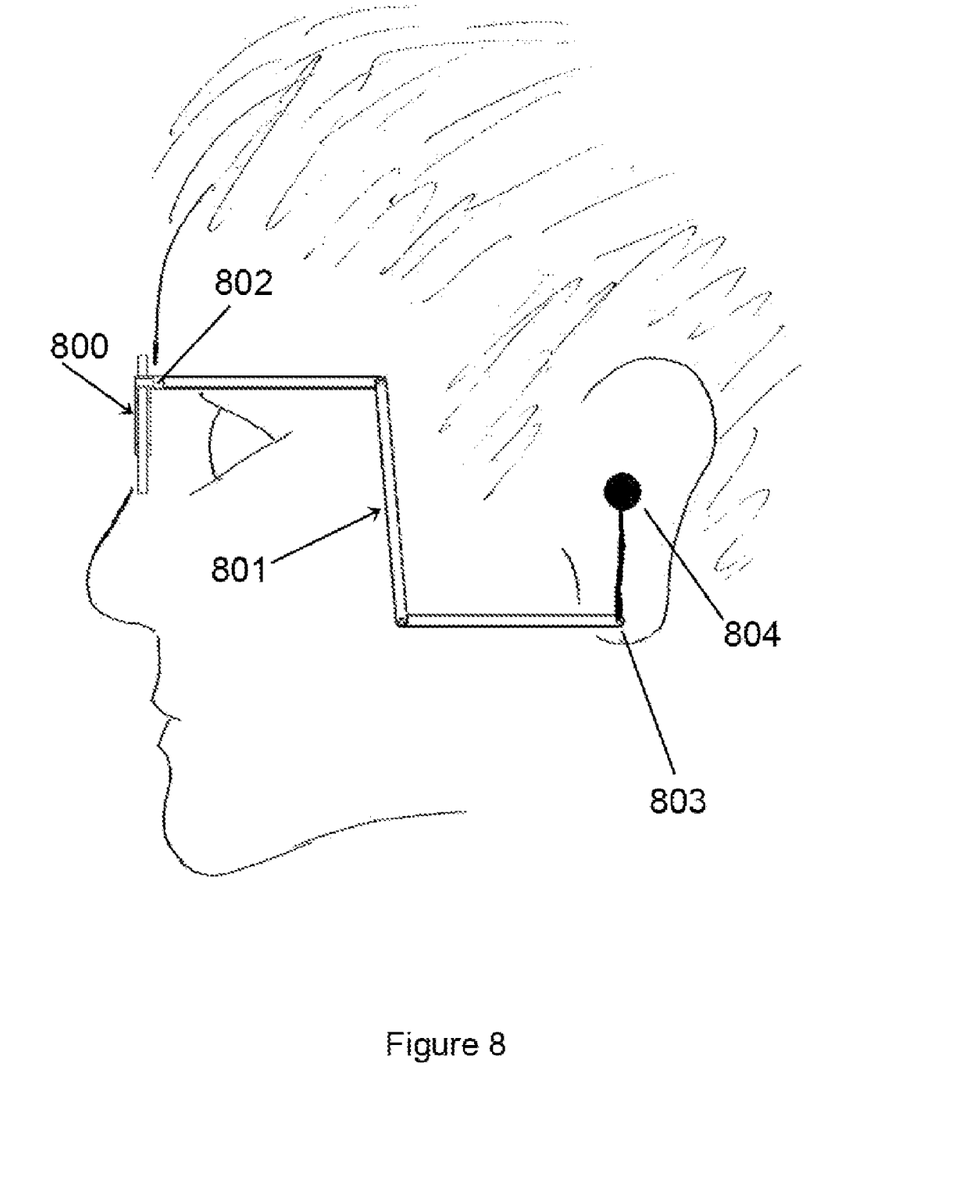
FIG. 8 shows a perspective view of another embodiment

FIG. 8 depicts a side view of one embodiment employing a listening earphone or earbud. Lens holding member 800 is held in place by two support members, although only one is shown 801. The proximal end 802 is connected to the lens holding member by means of a hinge or other flexible element as described herein. At the distal end 803, an audio transducer 804 such as an earphone or earbud exits from internal circuitry designed to receive transmissions from electronic devices as described above.

In certain embodiments, the electronic earphone or earbud may be attached at the distal end of the support member and may be used as the primary support means for the distal end of the support member, in place of a fastening mechanism to the earlobe.

In other embodiments, the distal end of the support member may be attached to the cord of a regular set of earbuds or earphones as used with various electronic devices.

In certain embodiments of the invention, the support members described herein may be used as replacement earpieces on existing eyeglasses and frames where in the support members assume any one of the above configurations of angular changes, curvilinear shape, and methods of attachment with the described fasteners and fastening mechanisms.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An eyeglass frame comprising: a lens-holding member and two support members, the support members each having a proximal end and a distal end, the proximal end being hingeably attached to the lens-holding member, and the distal end being terminated with a fastener, wherein said support members contain at least two angular changes of direction continuously adjustable from 0 to 180 degrees by at least two pivot members to align with and attach to the earlobes of the wearer.

2. The eyeglass frame of claim 1 wherein said fastener comprises a pierced-ear fastener to attach to the earlobes.

3. The eyeglass frame of claim 1 wherein said fastener comprises a spring earring clasp fastener to attach to the earlobes.

4. The eyeglass frame of claim 1 wherein said fastener comprises a magnetic earring fastener to attach to the earlobes.

5. The eyeglass frame of claim 1 wherein said fastener comprises an adhesive tab fastener to attach to the earlobes.

6. The eyeglass frame of claim 1 wherein the distal ends of the support members are each terminated with a hole for receiving the stud of a pierced ear earring to attach the support members to the wearer's earlobes.

7. A support member for eyeglasses comprising a proximal end and a distal end, the proximal end being attachable to a lens-holding member, and the distal end being terminated with a fastener, wherein the distal end of said support member is alignable to attach to the ears of a wearer of said eyeglasses and wherein said support member further comprises at least two angular changes of direction, continuously adjustable from 0 to 180 degrees by at least two pivot members contained on the support member, to align with said wearer's earlobes.

8. The support member of claim 7 wherein said fastener comprises a pierced-ear fastener to attach to the earlobes.

9. The support member of claim 7 wherein said fastener comprises a spring earring clasp fastener to attach to the earlobes.

10. The support member of claim 7 wherein said fastener comprises a magnetic earring fastener to attach to the earlobes.

11. The support member of claim 7 wherein said fastener comprises an adhesive tab fastener to attach to the earlobes.

12. An eyeglass frame comprising a lens holding member having a right side and a left side, two support members having a proximal end and a distal end, the proximal ends each of said support members being attached to the lens holding member, one on the left side and one on the right side thereof, and said distal ends of said support members terminating in a fastener, wherein said support members each further comprise two or more pivot points, said pivot points being rotatable from about zero to about 360 degrees.

13. A support member for eyeglasses comprising a proximal end and a distal end, the proximal end being attachable to a lens-holding member, and the distal end being terminated with a fastener, wherein said support member further comprises at least two angular changes of direction to align with and attach directly to said wearer's earlobes.

* * * * *